US007507004B2

(12) United States Patent

Chen

(10) Patent No.: US 7,507,004 B2

(45) Date of Patent: Mar. 24, 2009

(54) LAMP WITH HEAT DISSIPATING CAPABILITY

(76) Inventor: Chuen-Shing Chen, No. 71-2, Chuang-Chien Rd., Chuang-Chien Tsun, Shen-Kang Ksiang, Taichung Hsien (TW)

( * ) Notice: Subject to any disclaimer, the term of this patent is extended or adjusted under 35 U.S.C. 154(b) by 0 days.

(21) Appl. No.: 11/835,287

(22) Filed: Aug. 7, 2007

(65) Prior Publication Data

US 2008/0285289 A1 Nov. 20, 2008

(30) Foreign Application Priority Data

May 18, 2007 (TW) .............................. 96117884 A

(51) Int. Cl.
*B60Q 1/06* (2006.01)

(52) U.S. Cl. ........................ 362/373; 362/294; 362/245

(58) Field of Classification Search ................. 362/227, 362/235, 240, 244–246, 294, 310, 362, 368, 362/373, 540, 543–547, 800

See application file for complete search history.

(56) References Cited

U.S. PATENT DOCUMENTS

| | | | | |
|---|---|---|---|---|
| 4,733,335 | A * | 3/1988 | Serizawa et al. | 362/503 |
| 6,161,910 | A * | 12/2000 | Reisenauer et al. | 315/309 |
| 6,367,949 | B1 * | 4/2002 | Pederson | 362/240 |
| 6,461,024 | B1 * | 10/2002 | Becker et al. | 362/331 |
| 6,481,874 | B2 * | 11/2002 | Petroski | 362/373 |
| 6,565,239 | B2 * | 5/2003 | Rizkin et al. | 362/373 |
| 7,134,769 | B2 * | 11/2006 | Rohlfing et al. | 362/331 |
| 2006/0067077 | A1 * | 3/2006 | Kumthampinij et al. | 362/294 |

* cited by examiner

*Primary Examiner*—Hargobind S Sawhney

(74) *Attorney, Agent, or Firm*—Ladas & Parry, LLP

(57) ABSTRACT

A lamp includes a housing, a heat dissipating plate, a circuit unit, and a heat distributing unit. The housing includes a housing body surrounding an axis and having an opening. The heat dissipating plate is disposed in the housing body and has a peripheral portion contacting the housing body. The circuit unit is disposed in the housing body, and includes a base plate coupled to the heat dissipating plate, and a light emitting unit mounted to the base plate opposite to the heat dissipating plate. The heat distributing unit is disposed in the housing body, and includes a heat conducting bar coupled to the heat dissipating plate opposite to the circuit unit, and further coupled to a heat distributing plate opposite to the heat dissipating plate. The heat distributing plate has a plate periphery contacting the housing body.

3 Claims, 4 Drawing Sheets

LAMP WITH HEAT DISSIPATING CAPABILITY

CROSS-REFERENCE TO RELATED APPLICATION

This application claims priority of Taiwanese Application No. 096117884, filed on May 18, 2007.

BACKGROUND OF THE INVENTION

1. Field of the Invention

The invention relates to a lamp, more particularly to a lamp with heat dissipating capability.

2. Description of the Related Art

A lamp without heat dissipating capability usually burns out due to overheating, thereby resulting in a relatively short service life. Taiwanese Patent No. M309651 discloses a conventional lamp 1 (see FIG. 1) with heat dissipating capability, which includes a heat dissipating collar 11, a circuit unit 12, and a plurality of ribs 13. The heat dissipating collar 11 has an end surface 111 contacting the circuit unit 12, and an outer annular surface 112 contacting the ribs 13. A plurality of light emitting diodes 121 are mounted on the circuit unit 12, and generate heat when emitting light. Heat transmitted from an aluminum base plate 122 of the circuit unit 12 to a heat dissipating plate 123 that contacts the ribs 13 will be transmitted to the ribs 13 along one heat conducting path (as indicated by arrow A in FIG. 1), or transmitted via the heat dissipating collar 11 to the ribs 13 along another heat conducting path (as indicated by arrow B in FIG. 1), thereby preventing the circuit unit 12 from being burned out, and improving durability of the conventional lamp 1.

SUMMARY OF THE INVENTION

The object of the present invention is to provide a lamp with greater heat dissipating capability, thereby resulting in a longer service life.

Accordingly, a lamp of the present invention comprises a housing, a heat dissipating plate, a circuit unit, and a heat distributing unit. The housing includes a housing body surrounding an axis and having a first opening. The heat dissipating plate is disposed in the housing body, and has a peripheral portion contacting the housing body, a first plate side facing the first opening, and a second plate side disposed opposite to the first plate side. The circuit unit is disposed in the housing body, and includes a base plate and a light emitting unit. The base plate has a first plate surface coupled to the first plate side of the heat dissipating plate, and a second plate surface disposed opposite to the first plate surface. The light emitting unit is mounted to the second plate surface of the base plate, and faces the first opening in the housing body. The heat distributing unit is disposed in the housing body, and includes a heat conducting bar and a heat distributing plate. The heat conducting bar has a first contact end coupled to the second plate side of the heat dissipating plate, and a second contact end disposed opposite to the first contact end. The heat distributing plate is coupled to the second contact end of the heat conducting bar, and has a plate periphery contacting the housing body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
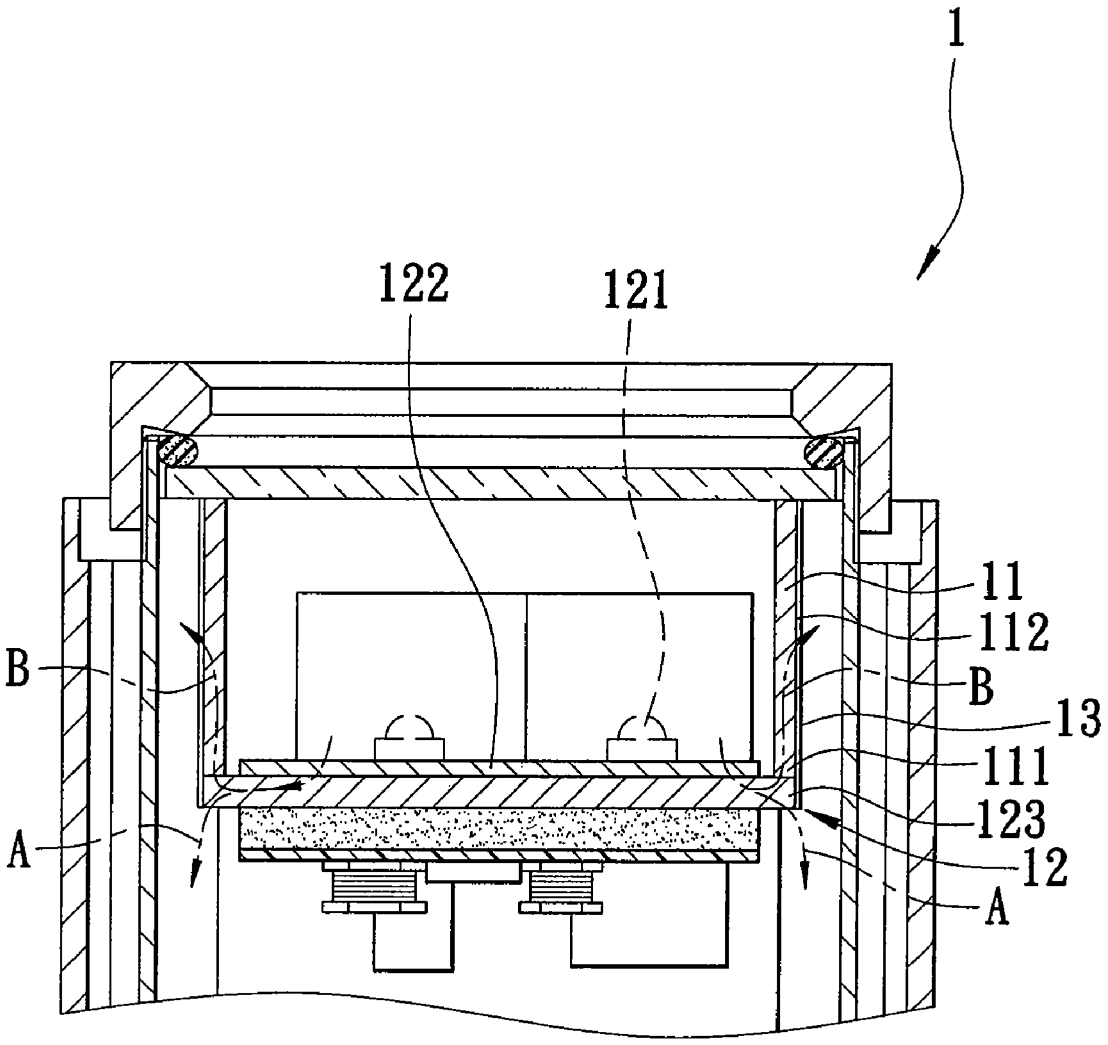
FIG. 1 PRIOR ART
FIG. 1 is a fragmentary sectional view of a conventional lamp.
Figure 2:
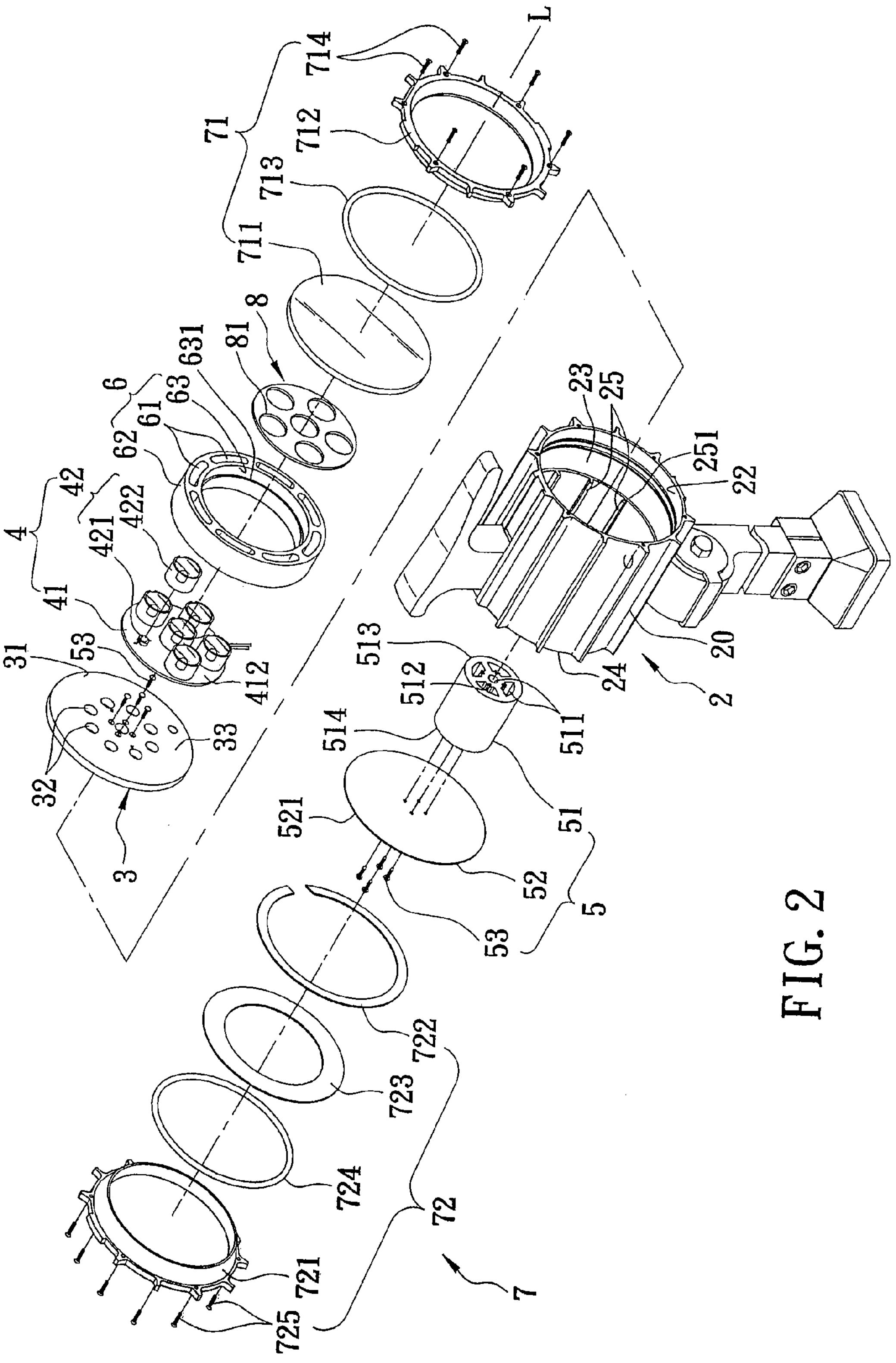
FIG. 2 is an exploded perspective view of a preferred embodiment of a lamp according to the invention.
Figure 3:
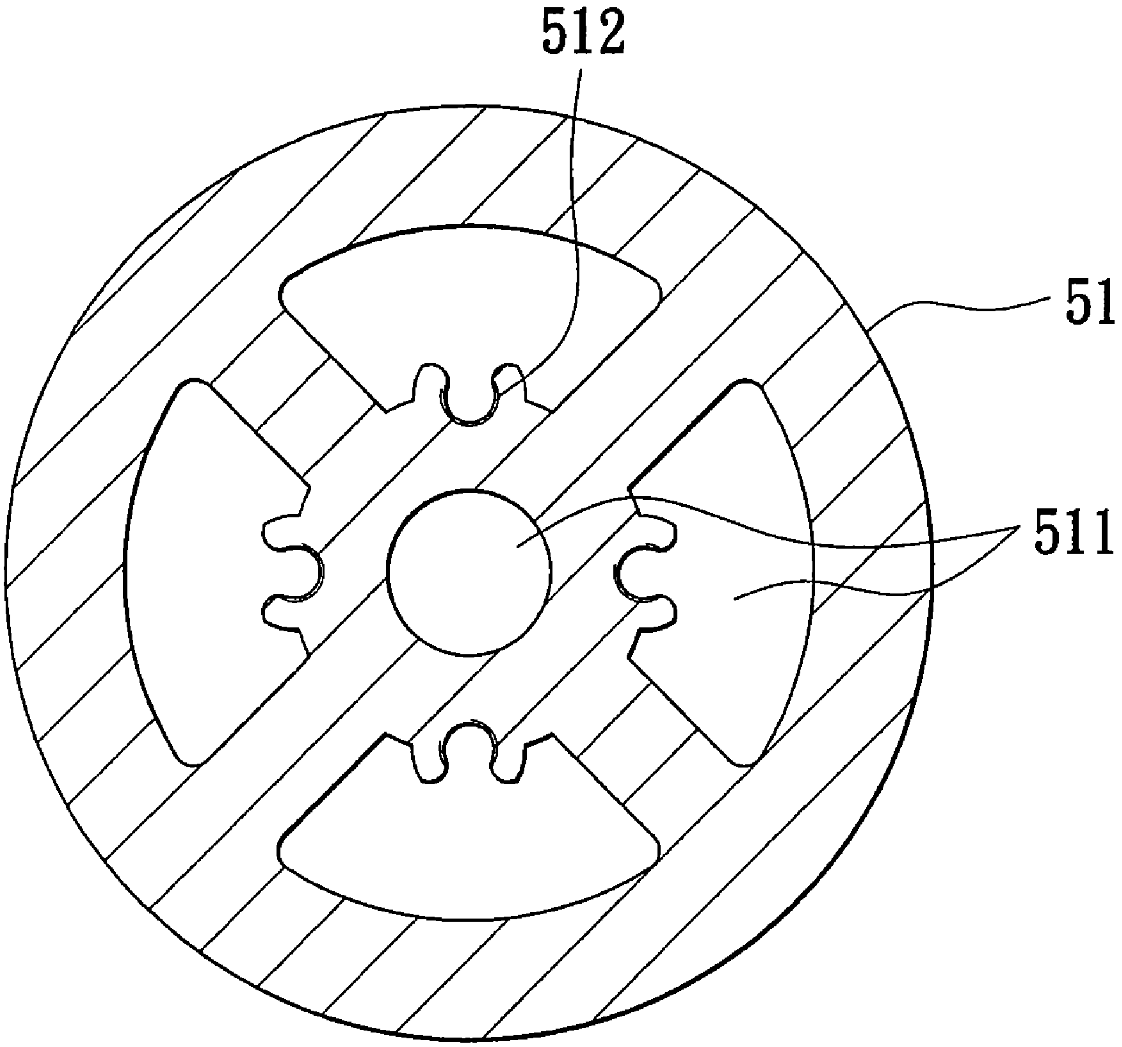
FIG. 3 is a cross-sectional view of a heat conducting bar of the preferred embodiment.
Figure 4:
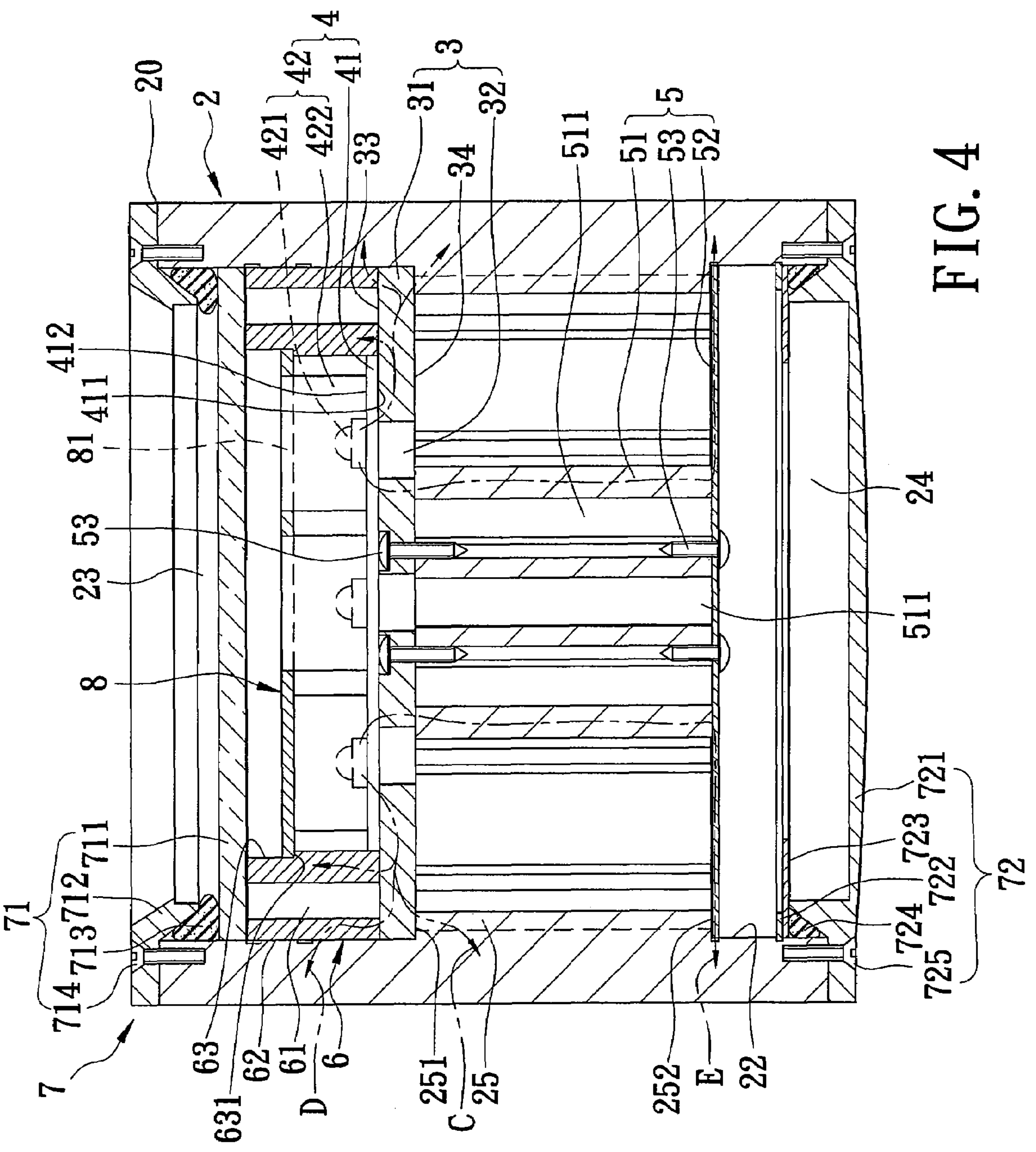
FIG. 4 is an assembled sectional view of the preferred embodiment.

As shown in FIGS. 2 to 4, the preferred embodiment of a lamp according to the present invention comprises a housing 2, a heat dissipating plate 3, a circuit unit 4, a heat distributing unit 5, a heat dissipating collar 6, a waterproofing unit 7, and a cover plate 8.

The housing 2 includes a housing body 20 that surrounds an axis (L), and that has a first opening 23, a second opening 24 formed in an axial direction opposite to the first opening 23, an inner wall surface 22 surrounding the axis (L), and a plurality of ribs 25 protruding radially and inwardly from the inner wall surface 22.

The heat dissipating plate 3 is disposed in the housing body 20 of the housing 2, and has a peripheral portion 31 contacting the housing body 20, a first plate side 33 facing the first opening 23 in the housing body 20, a second plate side 34 disposed opposite to the first plate side 33, and a plurality of plate holes 32 formed through the first and second plate sides 33, 34 for increasing heat conducting surface area of the heat dissipating plate 3.

The circuit unit 4 is disposed in the housing body 20 of the housing 2, and includes a base plate 41 and a light emitting unit 42. The base plate 41 has a first plate surface 411 coupled to the first plate side 33 of the heat dissipating plate 3, and a second plate surface 412 disposed opposite to the first plate surface 411. The light emitting unit 42 is mounted to the second plate surface 412 of the base plate 41, faces the first opening 23 in the housing body 20, and includes a plurality of light emitting diodes 421 and a plurality of light condensing components 422 covering up respectively the light emitting diodes 421. In this embodiment, the base plate 41 is an aluminum base plate, and each of the light emitting diodes 421 is a High Power light emitting diode.

The heat distributing unit 5 is disposed in the housing body 20 of the housing 2, and includes a heat conducting bar 51 and a heat distributing plate 52. The heat conducting bar 51 has a first contact end 513 coupled to the second plate side 34 of the heat dissipating plate 3, and a second contact end 514 disposed opposite to the first contact end 513. The heat distributing plate 52 is coupled to the second contact end 514 of the heat conducting bar 51, and has a plate periphery 521 contacting the housing body 20. The heat distributing unit 5 further includes a plurality of locking screws 53 for fastening the heat distributing plate 52, the heat conducting bar 51, and the heat dissipating plate 3 together. The heat conducting bar 51 is formed with a plurality of through holes 511 extending axially for increasing heat conducting surface area of the heat conducting bar 51, and a plurality of screw holes 512 through which the locking screws 53 respectively and threadedly extend. In this embodiment, the heat conducting bar 51 and the heat distributing plate 52 are made of aluminum having a high thermal conductivity, and the heat distributing plate 52 is chosen so as to comply with the heat dissipation requirement.

Each of the ribs 25 disposed in the housing body 20 of the housing 2 has a first end 251 disposed adjacent to the first opening 23 in the housing body 20 and contacting the peripheral portion 31 of the heat dissipating plate 3, and a second end 252 disposed adjacent to the second opening 24 in the housing body 20 and contacting the plate periphery 521 of the heat distributing plate 52 of the heat distributing unit 5.

The heat dissipating collar 6 is disposed in the housing body 20 of the housing 2 between the heat dissipating plate 3 and the first opening 23 in the housing body 20, surrounds the light emitting unit 42 of the circuit unit 4, and has one end opposite to the first opening 23 that abuts against the peripheral portion 31 of the heat dissipating plate 3. The heat dissipating collar 6 is formed with a plurality of collar holes 61 that extend axially for increasing heat dissipating surface area of the heat dissipating collar 6, and further has an outer annular surface 62 contacting the inner wall surface 22 of the housing body 20, and an inner annular surface 63 having a stepped portion 631.

The waterproofing unit 7 includes a first waterproofing member 71 disposed for closing the first opening 23 in the housing body 20 of the housing 2 and through which light passes, and a second waterproofing member 72 disposed for closing the second opening 24 in the housing body 20. The first waterproofing member 71 includes a transparent plate 711 for closing the first opening 23 in the housing body 20, a cover body 712 for positioning the transparent plate 711, a first seal ring 713 clamped between the transparent plate 711 and the cover body 712, and a plurality of first screws 714 for fastening the cover body 712 to the housing body 20. The heat dissipating collar 6 further has an opposite end adjacent to the first opening 23 that abuts against the transparent plate 711. The second waterproofing unit 72 includes an end cover 721 for closing the second opening 24 in the housing body 20, a spacer ring 723 disposed in the housing body 20 and positioned by a C-shaped positioning plate 722, a second seal ring 724 clamped between the end cover 721 and the spacer ring 723, and a plurality of second screws 725 for fastening the end cover 721 to the housing body 20. By virtue of the waterproofing unit 7, the lamp can be used underwater.

The cover plate 8 is mounted on the stepped portion 631 of the inner annular surface 63 of the heat dissipating collar 6, is disposed parallel to the base plate 41 of the circuit unit 4, and is formed with a plurality of light holes 81 that correspond respectively in position to the light condensing components 422 of the light emitting unit 42 of the circuit unit 4, and through which light passes. The cover plate 8 covers a plurality of conductive wires (not shown) disposed on the second plate surface 412 of the base plate 41, thereby resulting in a better quality appearance for the lamp according to the invention.

When the light emitting diodes 421 of the light emitting unit 42 of the circuit unit 4 emit light, heat will be generated therefrom. A part of the heat will be transmitted to the heat dissipating plate 3 via the base plate 41 of the circuit unit 4, will then be transmitted to the ribs 25 of the housing body 20 of the housing 2 via the first ends 251, and will eventually be transmitted to the housing body 20 for heat exchange with the surrounding air along a first heat conducting path (C) (as indicated by arrow C in FIG. 4). Another part of the heat will be transmitted to the heat dissipating plate 3 via the base plate 41, will then be transmitted to the heat dissipating collar 6, and will finally be transmitted to the housing body 20 via the inner wall surface 22 thereof for heat exchange with the surrounding air along a second heat conducting path (D) (as indicated by arrow D in FIG. 4). Yet another part of the heat will be transmitted to the heat dissipating plate 3 via the base plate 41, will then be transmitted to the heat distributing plate 52 of the heat distributing unit 5 via the heat conducting bar 51 of the heat distributing unit 5, and will eventually be transmitted to the housing body 20 for heat exchange with the surrounding air along a third heat conducting path (E) (as indicated by arrow E in FIG. 4). Compared to the prior art, the heat conducting bar 51 and the heat distributing plate 52 provide an additional heat conducting path, i.e., the third heat conducting path (E), thereby resulting in greater heat dissipating capability and higher heat dissipating efficiency to prevent the circuit unit 4 from being burned out due to overheating. Therefore, the lamp according to the invention has a longer service life than the prior art.

It should be noted that, while this invention is exemplified using a plurality of light holes 81, only one light hole 81 may be employed in other embodiments of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lamp comprising:

a housing including a housing body that surrounds an axis, and that has a first opening;

a heat dissipating plate disposed in said housing body and having
- a peripheral portion that contacts said housing body,
- a first plate side that faces said first opening in said housing body, and
- a second plate side that is disposed opposite to said first plate side;

- a circuit unit disposed in said housing body and including a base plate that has
  - a first plate surface coupled to said first plate side of said heat dissipating plate, and
  - a second plate surface disposed opposite to said first plate surface, and
  - a light emitting unit that is mounted to said second plate surface of said base plate, and that faces said first opening in said housing body; and
- a heat distributing unit disposed in said housing body and including
  - a heat conducting bar that has
    - a first contact end coupled to said second plate side of said heat dissipating plate, and
    - a second contact end disposed opposite to said first contact end, and a heat distributing plate that is coupled to said second contact end of said heat conducting bar, and that has a plate periphery contacting said housing body;

wherein heat generated by said circuit unit is transmitted to said housing body via said heat conducting bar and said heat distributing plate; and wherein said housing body of said housing further has a second opening formed in an axial direction opposite to said first opening, an inner wall surface surrounding the axis, and a plurality of ribs protruding radially and inwardly from said inner wall surface, each of said ribs having a first end disposed adjacent to said first opening and contacting said peripheral portion of said heat dissipating plate, and a second end disposed adjacent to said second opening and contacting said plate periphery of said heat distributing plate of said heat distributing unit.

2. The lamp as claimed in claim 1, further comprising a heat dissipating collar that is disposed in said housing body of said housing between said heat dissipating plate and said first opening in said housing body, that surrounds said light emitting unit of said circuit unit, and that has one end opposite to said first opening that abuts against said peripheral portion of said heat dissipating plate.

3. The lamp as claimed in claim 2, further comprising a cover plate that is disposed in said heat dissipating collar, that is disposed parallel to said base plate of said circuit unit, and that is formed with a light hole corresponding in position to said light emitting unit of said circuit unit.

* * * * *